United States Patent [19]

Richards et al.

[11] 4,147,757

[45] Apr. 3, 1979

[54] METHOD FOR PRODUCING AMMONIUM PHOSPHATE WHICH IS SUBSTANTIALLY FREE OF ARSENIC

[75] Inventors: Thomas E. Richards, Houston; Santad Kongpricha, Deer Park, both of Tex.

[73] Assignee: Olin Corporation, New Haven, Conn.

[21] Appl. No.: 852,649

[22] Filed: Nov. 18, 1977

Related U.S. Application Data

[63] Continuation-in-part of Ser. No. 749,856, Dec. 13, 1976, abandoned.

[51] Int. Cl.$^2$ .................... C01B 15/16; C01B 25/26; C01B 25/16
[52] U.S. Cl. .................................. 423/313; 423/310; 423/321 R
[58] Field of Search .................... 423/310, 313, 321 R

[56] References Cited

U.S. PATENT DOCUMENTS 2,044,940  6/1936  Haag et al. ........................ 423/310

FOREIGN PATENT DOCUMENTS 1059700  3/1954  France ................................. 423/321
4937038  4/1974  Japan .................................. 423/321

OTHER PUBLICATIONS

The Condensed Chemical Dictionary, 6 Ed., 1962, p. 111.

Primary Examiner—O. R. Vertiz
Assistant Examiner—G. A. Heller
Attorney, Agent, or Firm—William A. Simons; Thomas P. O'Day

[57] ABSTRACT

A process for producing ammonium phosphate that is substantially free of arsenic which comprises:
(a) reacting crude phosphoric acid containing dissolved arsenic having a +5 valence state with ammonia and arsenic-reducing agent in sufficient proportions to form an ammonium phosphate solution and to reduce the arsenic from the +5 valence state;
(b) forming ammonium phosphate crystals from said solution, leaving a mother liquor that contains substantially all of said arsenic; and
(c) recovering said ammonium phosphate crystals that are substantially free of arsenic from said mother liquor.

25 Claims, No Drawings

METHOD FOR PRODUCING AMMONIUM PHOSPHATE WHICH IS SUBSTANTIALLY FREE OF ARSENIC

RELATED APPLICATIONS

This application is a continuation-in-part application of U.S. Patent Application Ser. No. 749,856 filed on Dec. 13, 1976, now abandoned.

BACKGROUND OF THE INVENTION

I. Field of Invention

This invention relates to the production of ammonium phosphate. In particular, this invention relates to a process for making ammonium phosphates such as mono- and di-ammonium phosphates that are substantially free of arsenic from crude phosphoric acid.

II. Description of the Prior Art

For many commercial applications today, it is desirable to prepare ammonium phosphates from phosphoric acid. However, the cost involved when starting with highly pure grades of phosphoric acids (e.g., thermal grade acid) is normally too high to be economically advantageous. Therefore, it is necessary to explore the possibilities of employing cheaper phosphoric acid (e.g., wet process acid) to make ammonium phosphates. However, the employment of these less expensive grades of phosphoric acid may result in the ammonium phosphate products containing more impurities. In many instances these impurities are objectionable. For example, ammonium phosphate containing dissolved arsenic such as elemental arsenic, salts containing arsenic ions, chemical complexes containing arsenic and the like cannot be used for food or industrial grade applications. Instead such arsenic-containing ammonium phosphates are limited to less commercially attractive uses such as fertilizers and the like. Thus, because of this arsenic impurity problem, effective usage of the cruder grades of phosphoric acid as a starting material for making ammonium phosphate may be hindered. A need exists in the art to develop a process for making ammonium phosphate products having relatively low levels of arsenic from these less expensive grades of phosphoric acid. The present invention provides such a process.

The usual prior art process for making ammonium phosphate products from relatively pure phosphoric acid, as illustrated in U.S. Pat. No. 3,388,966, issued on June 18, 1968 to R. A. MacDonald, is to (1) ammoniate the phosphoric acid to form ammonium phosphate products and insoluble matter, (2) filter off the undesirable insoluble matter, (3) crystallize the ammonium phosphate products from the mother liquor and (4) recover these crystals. While this process is acceptable for producing arsenic-free ammonium phosphate products from relatively pure phosphoric acid, it cannot be used to produce arsenic-free ammonium phosphate from phosphoric acid containing large amounts of dissolved arsenic. Instead, this arsenic may co-crystallize with the ammonium phosphate products and prevent the latter's use as a food or industrial grade ammonium phosphates.

The prior art also teaches that dissolved arsenic can be removed from crude phosphoric acid by adding barium sulfide to precipitate the arsenic. See U.S. Pat. No. 2,044,940, issued on June 23, 1936 to I. L. Haag and W. R. Devor. One of the problems with this process is that an additional filtration step is also used to remove the resulting arsenic precipitates immediately after addition of the barium sulfide. This filtration step increases the cost of the overall ammonium phosphate process because extra solids-handling steps must now be included. Also, as explained below, the employment of barium sulfide may decrease the amount of $P_2O_5$ in the ammonium phosphate product.

BRIEF SUMMARY OF THE INVENTION

Accordingly, the present invention provides a process for making substantially arsenic-free ammonium phosphate from crude phosphoric acid which contains undesirably high levels of dissolved arsenic having a +5 valence state. This process comprises the steps of (a) reacting crude phosphoric acid containing arsenic in the +5 valence state with ammonia and arsenic-reducing agent in sufficient proportions to form ammonium phosphate solution and to reduce the arsenic from a +5 valence state; (b) forming ammonium phosphate crystals from the solution, leaving a mother liquor that contains substantially all of the arsenic impurities and (c) recovering the ammonium phosphate crystals that are substantially free of arsenic from the mother liquor.

Usually, the crude phosphoric acid also contains other impurities besides arsenic. These other impurities include other metallic impurities such as iron and aluminum. When these latter elements are present in sufficient quantities, they will form metallic phosphate precipitates during the ammoniation and these precipitates will normally have to be separated before the crystallization step. Accordingly, a separation step, such as by filtration, is usually employed before the crystallization in step (b) above.

DETAILED DESCRIPTION

The crude phosphoric acid employed as a starting material in the present invention can be any impure, commercially available phosphoric acid solution containing undesirable amounts of arsenic, particularly arsenic having a +5 valence. The crude acid may also contain other impurities such as sulfates, silico-fluorides, iron, aluminum, manganese and organic matter. Moreover, this crude starting material may include phosphoric acids commonly known as "black acid" or a purer grade known as "green acid." Generally, crude phosphoric acid may be used which contains from about 15% to about 50%, more preferably about 20% to about 40%, by weight of $P_2O_5$. Phosphoric acid concentrations less than these may result in the need for removal of excessive water during the formation of ammonium phosphate crystals. Phosphoric acid concentrations greater than these may cause problems when separating insoluble precipitates after ammoniation.

This invention is particularly adapted for use with crude phosphoric acid solutions produced by the so-called "wet process" since presently this is one of the least expensive ways of making phosphoric acid. This wet process is described in detail in Waggaman, W. H., *PHOSPHORIC ACID, PHOSPHATES AND PHOSPHATIC FERTILIZERS*, Second Edition, Reinhold Publishing Corporation, New York, 1952. Ordinarily, the wet process method would not be suitable for production of industrial or food grade phosphates because of the many impurities including arsenic normally contained therein. Thus, it is one of the significant advantages of this invention that impure wet process phosphoric acid can be used to successfully produce relatively pure ammonium phosphates suitable for industrial and food uses, as well as being useful as fertilizers. Alternatively, it should be understood that acids produced by more expensive methods such as electric furnace or thermal grade methods can also be advantageously used in the present process, provided that they contain undesirable amounts of arsenic which need to be removed.

The term "arsenic" as employed in the present description and claims includes all forms of arsenic such as elemental arsenic and arsenic ions, salts, complexes and inter-connecting networks of compounds containing arsenic and the like. In particular, the term "arsenic" includes all forms of arsenic where arsenic has a $+5$ valence state. Normally, arsenic originates mainly from naturally-occurring arsenic compounds contained in phosphate rock from which phosphoric acid is made and are thought to exist for the most part as dissolved ions in the highest oxidation state, namely $As^{+5}$. In crude phosphoric acids such as those made by the wet process, the amount of arsenic may generally range from more than 5 to about 200 parts per million (ppm) parts by weight of the $P_2O_5$ present in the acid. More usually, arsenic ranges from about 10 to 50 ppm parts by weight $P_2O_5$.

According to the present invention, the crude phosphoric acid containing arsenic having a $+5$ valence state is reacted with ammonia and an arsenic-reducing agent in sufficient proportions to form ammonium phosphate solution and to reduce the arsenic from the $+5$ valence to a lower valence state, usually to the $+3$ valence state. The important function of this step besides the formation of ammonium phosphate solution is to change the crystallization character of the $+5$ valence arsenic so that it will not co-crystallize with ammonium phosphate. Specifically, it is believed that if the crude phosphoric acid containing arsenic in the $+5$ valence state is not reacted with both ammonia and an arsenic-reducing agent, then it is likely that ammonium arsenate [$(NH_4)_3AsO_4$ where the As remains in a $+5$ valence state] and ammonium phosphate will be formed. Further, since the arsenate ion, $AsO_4^{-3}$ has a similar structure to the phosphate ion, $PO_4^{-3}$, it is likely that the ammonium arsenate and ammonium phosphate will co-crystallize together. On the other hand, if the arsenic having a $+5$ valence state is reduced by means of reaction with an arsenic-reducing agent, then the valence state of the $+5$ arsenic will be lowered and its crystallization character will be changed. For example, if arsenic is reduced to a $+3$ valence state, then it is likely that ammonium arsenite [$(NH_4)_3AsO_3$] will be formed. Since the arsenite ion, $AsO_3^{-3}$, has a different structure than the phosphate ion, $PO_4^{-3}$, it is not likely to co-crystallize with ammonium phosphate in the subsequent crystallization step of the present process.

The order of how the ammonia and arsenic-reducing agent are reacted with crude phosphoric acid is not critical to the present invention. The reactions may occur in any sequence. For example, it may be desirable to react the crude acid with ammonia to form the ammonium phosphate solution and then add the arsenic-reducing agent to the solution to reduce the arsenic in the $+5$ valence state contained therein. Alternatively, the ammonia and arsenic-reducing agent may be added together to the crude acid so that both formation of the ammonium phosphate solution and reduction of the arsenic may occur simultaneously. And, in one embodiment of this invention, it may be preferred to add sufficient amount of arsenic-reducing agent first, followed by the addition of the ammonia to the crude acid. Still further, it may be preferred to partially ammoniate to raise the pH of the crude phosphoric acid to the range of about 2.0–4.0, then add the arsenic-reducing agent, followed by more ammoniation to raise the pH to about 5.0–6.0 and form the desired ammonium phosphate product. This latter method is preferred when using alkali-metal or ammonium sulfide as arsenic reducing agents for the present invention because it is believed to minimize the generation of gaseous $H_2S$.

The reaction of ammonia with the phosphoric acid to form ammonium phosphate is well known and any conventional technique for obtaining the desired ammonium phosphate product may be employed for the process of the present invention. Generally, the ammoniation may be accomplished by bubbling anhydrous ammonia up from the bottom of a tank containing the crude phosphoric acid. This reaction may take place in any number of stages, but usually one- or two-stage reactions are preferred. Normally, the ammoniation of the crude phosphoric acid causes the pH of the resulting solution to increase from about 1.0–2.0 up to about 5.0–6.0.

Different ammonium phosphate products such as mono-ammonium phosphate, di-ammonium phosphate or combinations thereof may be formed by adjusting the molar ratio of the two reactants. For example, the molar ratio of $NH_3$ to the $H_3PO_4$ in the production of mono-ammonium phosphate will generally be in the range from about 1:1 to about 1:1.3, more preferably from about 1:1 to about 1:1.2. Simultaneously, this raise in pH will cause the precipitation of insoluble metallic phosphates such as aluminum phosphates and iron phosphates if such metallic impurities are present in the crude phosphoric acid.

The term "arsenic-reducing agent" as employed in the present specification and claims includes all chemical agents which are capable of reducing arsenic from a $+5$ valence state to a lower valence, such as the $+3$ state, in crude phosphoric acid or ammoniated phosphoric acid solutions. Illustrative examples of such reducing agents include sulfur-bearing compounds such as alkali metal sulfides, ammonium sulfide, hydrogen sulfide, alkali metal sulfites, ammonium sulfite, sulfur dioxide (preferably, in ammoniated phosphoric acid solutions), alkali metal thiosulfates and ammonium thiosulfate. Specific preferred compounds include sodium and potassium sulfide, ammonium sulfide, hydrogen sulfide, and sodium thiosulfate. Most preferred are sodium and potassium sulfide, because of their low economic cost and easy use.

Such sulfur-bearing arsenic-reducing agents are believed to reduce dissolved arsenic having a $+5$ valence state in the crude phosphoric acid and ammoniated phosphoric acid solutions by reactions illustrated by the following equations:

$$5M_2S + 2As^{+5} \rightarrow As_2S_5 + 10M^{+1} \qquad (IA)$$

$$As_2S_5 \rightarrow As_2S_3 + 2S \qquad (IB)$$

$$5(NH_4)_2S + 2As^{+5} \rightarrow As_2S_5 + 10NH_4^{+1} \qquad (IIA)$$

$$As_2S_5 \rightarrow As_2S_3 + 2S \qquad (IIB)$$

$$5H_2S + 2As^{+5} \rightarrow As_2S_5 + 10H^{+1} \qquad (IIIA)$$

$$As_2S_5 \rightarrow As_2S_3 + 2S \qquad (IIIB)$$

$$M_2SO_3 + As^{+5} + H_2O \rightarrow As^{+3} + H_2SO_4 + 2M^{+1} \quad (IV)$$

$$(NH_4)_2SO_3 + As^{+5} + H_2O \rightarrow As^{+3} + H_2SO_4 + 2NH_4^{+1} \quad (V)$$

$$SO_2 + As^{+5} + H_2O \rightarrow As^{+3} + SO_3 + 2H^+ \quad (VI)$$

$$M_2S_2O_3 + As^{+5} + H_2O \rightarrow As^{+3} + H_2SO_4 + 2M^{+1} + S \quad (VII)$$

$$(NH_4)_2S_2O_3 + As^{+5} + H_2O \rightarrow As^{+3} + H_2SO_4 + 2NH_4^{+1} + S \quad (VIII)$$

where M is an alkali metal cation.

In each of the above reactions, the resulting $As_2S_3$ or $As^{+3}$ ion will normally react with the ammonia and water present to form the ammonium arsenite, wherein the valence state of the arsenic has been reduced to a +3 state. This reaction is illustrated by the following equations:

$$As_2S_3 + 6NH_3 + 6H_2O \rightarrow 2(NH_4)_3AsO_3 + 3H_2S \quad (IX)$$

While it is believed that all arsenic having a +5 valence contained in the crude phosphoric acid or ammoniated phosphoric acid solution will not necessarily react according to these equations, it is also felt that a significant proportion of the arsenic having a +5 valence state will be reduced according to them and, therefore, the appropriate equation may be employed at least on a rough basis for determining the stoichiometric amounts of arsenic-reducing agents to be added to the crude phosphoric acid or ammoniated phosphoric acid solution.

In particular, the amount of arsenic-reducing agent added should generally be sufficient to reduce at least a major portion of arsenic which was originally present in a +5 valence state to a lower valence, most likely, the +3 state. By doing this, it is possible to significantly lower or prevent substantially all of the arsenic from co-crystallizing with the ammonium phosphate. The minimum amount of arsenic-reducing agent will additionally depend on the total concentration of cationic impurities in the oxidized state, such as $Fe^{+3}$ which along with the arsenic may also consume some of the anions of the arsenic-reducing agents. Generally, the proportion of arsenic-reducing agents added to the crude phosphoric acid or ammoniated phosphoric acid solutions will range from at least the stoichiometric proportion (as illustrated by the above equations) necessary to react with all of the arsenic present to as much as about 100 times, preferably from about 10 to about 75 times the stoichiometric proportion.

In one preferred embodiment of the present invention, an alkali metal sulfide such as sodium or potassium sulfide is added to the crude phosphoric acid before the ammoniation is initiated. As shown in Equations (IA) and (IB), above, reactions occur whereby the arsenic having the +5 valence state is reduced to arsenic sulfide, $As_2S_3$. The sulfide anion also reduces with other metal ions such as ferric. The amount of added alkali metal sulfide is, thus, usually in excess of the stoichiometric amount needed to react only with the arsenic. Preferably, from about 10 to about 75 times the stoichiometric amount needed to react with the total arsenic in the crude phosphoric acid as in accordance with Equations (IA) and (IB) is generally desirable. After the addition of the arsenic-reducing agent is completed, the crude phosphoric acid is ammoniated in any conventional manner to form an ammonium phosphate solution, usually having a pH in the range of from about 5.0 to about 6.0.

In another preferred embodiment of the present invention, the crude phosphoric acid is partially ammoniated to raise the pH of the solution to a range from about 2.0 to about 4.0, then an alkali metal sulfide such as sodium sulfide is added in sufficient stoichiometric excess, as explained above, to reduce at least a major portion of the arsenic having a +5 valence state. After adding the alkali metal sulfide, the solution is again ammoniated to form an ammonium phosphate solution having a pH in the range of from about 5.0 to about 6.0.

It should be noted that the employment of any of the above-mentioned sulfur-bearing, arsenic-reducing agents will have certain advantages over the similar use of barium sulfide, as illustrated in U.S. Pat. No. 2,044,940. For example, when barium sulfide or other alkaline earth sulfides are used as an arsenic-reducing agent, then an immediate excessive precipitation of insoluble materials such as barium sulfate and barium phosphate may result. This excessive precipitation of insolubles requires an immediate separation step following the addition of the alkali earth sulfides. Note this separation is illustrated in U.S. Pat. No. 2,044,940. Such a separation step is undesirable because it adds to the cost and length of the process, and usually requires additional processing steps to handle the separated solids, thereby diminishing the economic viability of the process. Moreover, the precipitation of barium phosphates will result in a decrease in the $P_2O_5$ yield in the desired ammonium phosphate product. Sodium sulfide and other alkali metal sulfides, on the other hand, form soluble salts with phosphate and other ions present in the crude ammoniated phosphoric acid, so there is no need for an immediate separation step after its addition nor will there be a decrease in the $P_2O_5$ yield in the desired product because of precipitation of phosphate salts.

The reaction of the ammonia and the arsenic-reducing agent with the crude phosphoric acid may be carried out at any convenient temperature and pressure. The ammoniation reaction temperatures usually employed are in the range of from about 80°–120° C. because the ammoniation reaction is exothermic and the reaction can be easily controlled by the evaporation of water at its boiling point. This evaporation removes the heat of reaction and facilitates a steady state reaction. The reaction temperatures of arsenic-reducing agent with the crude phosphoric acid or ammoniated phosphoric acid solution may range from about 25° C. (i.e., ambient) up to about 120° C. It should be noted that at higher temperatures, $H_2S$ or $SO_2$ gas may be evolved, thus increasing the need for more arsenic-reducing agent. For convenience, both the arsenic reduction reaction and ammoniation are carried out at atmospheric pressures, but pressures above ambient may be employed where desired. Both reactions are usually substantially instantaneous, but mixing for a period of about 15 minutes to about 2 hours may be employed to insure complete reaction. In summary, it is to be understood, however, that any of the ammoniation reaction parameters just cited are merely illustrative of various known techniques for preparing ammonium phosphates and any such technique known in the art may be utilized herein.

Following the ammoniation and arsenic reduction it may be desirable to separate any insoluble precipitates such as metallic precipitates from the ammonium phosphate solution. Vacuum filtration is the preferable means of accomplishing this result. However, centrifuging, clarification and other convenient means of separating unstable liquid-solid mixtures may be also employed. The temperature during this separation step is preferably at a high temperature in the range from about 70° C. to about 110° C. in order to have the liquid-solid separation occur readily. The separated precipitates are either discarded or, preferably, employed in useful products such as fertilizers. These precipitates usually contain large amounts of iron phosphates and aluminum phosphates.

If such a separation step is used, the resultant clarified liquid solution comprises dissolved ammonium phosphates along with the reduced arsenic and dissolved anion impurities such as sulfate and fluoride ions with some organic residues. This clarified solution is now subjected to conventional crystallization methods where ammonium phosphate crystals are formed that are substantially free of arsenic. Preferably, the crystals are formed by first concentrating the liquid phase by evaporation and then lowering the temperature of this concentrated mother liquor. Ammonium phosphate crystals are formed during and after the concentration step and crystallization occurs quickly. Impurities (e.g., reduced arsenic, sulfates, fluorides and organics) tend to remain soluble in the mother liquor and do not co-crystallize with the ammonium phosphate. Normally crystallization temperatures in the range from about 30° C. to about 120° C., and preferably from about 40° C. to about 110° C., are employed. Any conventional crystallization techniques used to obtain ammonium phosphate crystals may be employed in the process of this invention. Note U.S. Pat. No. 3,388,966, cited above, which teaches a suitable method of crystallizing ammonium phosphate.

After the formation of crystals, the ammonium phosphate crystal product is recovered from the mother liquor. Usually this is done by centrifuging, although other known means of separating crystals from mother liquors can be employed. The mother liquor can be discarded or recycled, but preferably it is also employed in making other products such as fertilizers.

The recovered crystals of ammonium phosphate include such products as mono-ammonium phosphate, di-ammonium phosphate and combinations thereof and are of very high purity and ready for use in making other phosphate products. Preferably, they are first washed to remove any residue of the mother liquor still present on the surface of the crystals. The resulting ammonium phosphate crystals are substantially free of arsenic. In contrast, prior art methods of crystallizing ammonium phosphates from crude phosphoric acid could not insure this desirable result without further processing steps.

It should be understood that the term "substantially free of arsenic," as used in the specification and claims, includes levels of arsenic that are less than about 5.0 parts per million parts by weight of $P_2O_5$ present.

Although the pure ammonium phosphate product produced by the present process may also be used as fertilizer, it is ordinarily of such high purity that it is preferable to employ it as an intermediate to produce industrial or food grade phosphates. Examples of such uses are shown in U.S. Pat. Nos. 3,939,254; 3,957,955; and 3,965,245, issued on Feb. 17, 1976; May 18, 1976; and June 22, 1976, respectively to B. H. Nicolaisen, wherein sodium phosphate is produced from monoammonium phosphate.

The following examples further illustrate the process of the present invention. All parts and percentages are by weight unless stated otherwise. For the present invention, the term "major portion" is defined to mean at least about 50% by weight.

EXAMPLE 1

Wet process crude phosphoric acid (approximately 25% by weight $P_2O_5$) which contained arsenic in the amount of 17.7 parts per million parts by weight of $P_2O_5$ present in the crude acid was fed into a tank at a temperature of about 60° C. and ambient pressure. Sodium sulfide was added to this tank in the amount of five pounds per 1000 gallons of the crude phosphoric acid. The mixture was agitated for a time to allow complete dispersal and reaction of the sodium sulfide in the phosphoric acid. After a major portion of the arsenic sulfide precipitated, the mixture was then neutralized with anhydrous ammonia in two-stage ammoniation process under conditions that monoammonium phosphate was formed and the final pH was about 5.5. The reaction temperature was kept between about 80°-110° C. by the exothermic heat of reaction and the reaction pressure was atmospheric. Moreover, this ammoniation step resolubilized a major portion of the arsenic which was previously rendered insoluble by reaction with sodium sulfide. Insoluble materials such as aluminum phosphates and iron phosphates were simultaneously precipitated during this ammoniation step. These insoluble precipitates were then separated from the solution of mono-ammonium phosphate by vacuum filtration. The temperature of the resulting clarified solution was then lowered to about 55° C. while removing water vapor under vacuum to effect crystallization. The resulting slurry of mono-ammonium phosphate crystals was centrifuged to separate crystals, and the crystals were washed to remove any entrapped liquid. These crystals were then analyzed and were found to contain arsenic in only about 2.5-3.4 ppm parts by weight of $P_2O_5$ present in the mono-ammonium phosphate.

This example shows that there was a substantial reduction in the amount of arsenic in the purified monoammonium phosphate product as compared to the crude phosphoric acid starting material by employing the process of this invention.

EXAMPLE 2

Wet process crude phosphoric acid (25% by weight $P_2O_5$) containing arsenic in an amount of 17.0 parts per million parts by weight of $P_2O_5$ present in the acid was processed according to the procedure of Example 1. The mono-ammonium phosphate crystals were recovered, analyzed and found to contain arsenic in only about 1.9 ppm parts by weight of $P_2O_5$ present in monoammonium phosphate.

EXAMPLES 3–8

Six 500 ml samples of plant grade phosphoric acid (containing 22.4% by weight $P_2O_5$ and 4.33 ppm of As) were collected. Into each sample, either a 10-fold, 25-fold, or 50-fold weight ratios of $Na_2S$ or $(NH_4)_2S$ to the As was added, as indicated below in Table I. These weight ratios of $Na_2S$ or $(NH_4)_2S$ are approximately the same as the molar ratio of these two compounds to As.

After addition of these arsenic-reducing agents, the resulting mixture was ammoniated at elevated temperatures (approximately 90° C.) until the pH of the mixture was adjusted to between 5.5 and 5.8. A filter aid was added and iron and aluminum phosphates immediately precipitated out. Then, 250 ml of clarified solution was removed from each sample.

These six clarified solutions were then boiled down to about 200 ml volume and cooled to form mono-ammonium phosphates crystals and a resulting mother liquor. The crystals were separated from the mother liquor and washed once with a saturated reagent-grade mono-ammonium phosphate aqueous solution. The resulting six mother liquors and crystals were then analyzed for $P_2O_5$ and As values and the ratio of As to $P_2O_5$ was calculated. These results are given in Table I below. Results showed similar effectiveness in arsenic removal from the mono-ammonium phosphate crystals both for the $Na_2S$ and $(NH_4)_2S$, although $Na_2S$ was slightly better than $(NH_4)_2S$.

TABLE I

| EXAMPLE | Sample | % $P_2O_5$ in Mother Liquor or Crystals | As, ppm of Mother Liquor Or Crystals | Parts of As per Million Parts of $P_2O_5$ in Mother Liquor or Crystals |
|---|---|---|---|---|
| 3–8 | Crude Phosphoric Acid | 22.4 | 4.3 | 19.3 |
| 3 | Mother Liquor-10 Fold $Na_2S$ | 21.0 | 5.4 | 25.7 |
| 3 | Crystals-10 Fold $Na_2S$ | 58.0[1] | 1.1 | 1.9 |
| 4 | Mother Liquor-25 Fold $Na_2S$ | 20.6 | 6.2 | 28.1 |
| 4 | Crystals-25 Fold $Na_2S$ | 58.0[1] | 1.4 | 2.4 |
| 5 | Mother Liquor-50 Fold $Na_2S$ | 19.9 | 5.0 | 25.1 |
| 5 | Crystals-50 Fold $Na_2S$ | 58.0[1] | 1.2 | 2.1 |
| 6 | Mother Liquor-10 Fold $(NH_4)_2S$ | 20.7 | 9.9 | 47.8 |
| 6 | Crystals-10 Fold $(NH_4)_2S$ | 58.0[1] | 2.5 | 4.3 |
| 7 | Mother Liquor-25 Fold $(NH_4)_2S$ | 26.3 | 11.1 | 42.2 |
| 7 | Crystals-25 Fold $(NH_4)_2S$ | 58.0[1] | 2.2 | 3.8 |
| 8 | Mother Liquor-50 Fold $(NH_4)_2S$ | 21.2 | 11.6 | 54.7 |
| 8 | Crystals-50 Fold $(NH_4)_2S$ | 58.0[1] | 1.7 | 2.9 |

[1]Approximate $P_2O_5$ Concentration

EXAMPLES 9–12

Four samples of plant grade phosphoric acid (containing 23.0% by weight $P_2O_5$ and 3.4 ppm of As) were collected, treated with $Na_2S$, ammoniated, and mono-ammonium phosphate crystals were formed and recovered as in preceding Examples 3–8 except herein the crude phosphoric acid was partially ammoniated to a pH of 2.6 before treatment with $Na_2S$. Experimental results in Table II show the four samples being treated with $Na_2S$ for various amounts of time (for 15 to 60 minutes) before continuation of the ammoniation to a pH of 5.5. Also, 95-fold weight excess of $Na_2S$ over the As was added to each sample.

The results in Table II show effective arsenic separation from the mono-ammonium crystals when $Na_2S$ is used with partially ammoniated crude phosphoric acid instead of non-ammoniated crude acid as was illustrated in the preceding examples.

TABLE II

| EXAMPLE | Sample | % $P_2O_5$ in Mother Liquor or Crystals | As, ppm of Mother Liquor or Crystals | Parts of As Per Million Parts of $P_2O_5$ in Mother Liquor or Crystals |
|---|---|---|---|---|
| 9–12 | Crude Phosphoric Acid | 23.0 | 3.4 | 14.8 |
| 9 | Mother Liquor 15 Minute Reaction | 21.4 | 2.6 | 12.1 |
| 9 | Crystals 15 Minute Reaction | 58[1] | 0.3 | 0.5 |
| 10 | Mother Liquor 30 Minute Reaction | 20.6 | 4.4 | 21.4 |
| 10 | Crystals 30 Minute Reaction | 58[1] | 0.6 | 0.9 |
| 11 | Mother Liquor 45 Minute Reaction | 22.9 | 2.4 | 10.5 |
| 11 | Crystals 45 Minute Reaction | 58[1] | 0.3 | 0.5 |
| 12 | Mother Liquor 60 Minute Reaction | 21.6 | 3.4 | 15.7 |
| 12 | Crystals 60 Minute Reaction | 58[1] | 0.3 | 0.5 |

[1]Approximate $P_2O_5$ Concentration

COMPARISON 1

The same procedure was carried out as in Example 1 except the sodium sulfide treatment was not employed and the crude wet process phosphoric acid (25% $p_2O_5$) contained arsenic in the amount of 16.3 parts per million parts by weight of $P_2O_5$ in the acid. The resulting mono-ammonium phosphate crystals contained arsenic in the amount of 13.1 parts per million parts by weight based on $P_2O_5$ present in the mono-ammonium phosphate. This indicates that without the sodium sulfide addition step, there was very little reduction in the level of arsenic in the resulting ammonium phosphate crystals.

COMPARISON 2

The procedure of Examples 3–8 above was repeated except that a sample of plant-grade phosphoric acid was not preliminarily combined with either $Na_2S$ or $(NH_4)_2S$ before ammoniation. Instead, the sample was directly ammoniated. The results are shown in Table III below. Comparison of these results with those in Table I shows that preliminary treatment of the crude phosphoric acid with either Na$_2$S or (NH$_4$)$_2$S prior to the ammoniation will substantially reduce arsenic co-crystallization with the mono-ammonium phosphate.

TABLE II

| Comparison 2 | % P$_2$O$_5$ in Mother Liquor or Crystals | As, ppm of Mother Liquor or Crystals | Parts of As per Million Parts of P$_2$O$_5$ in Mother Liquor or Crystals |
|---|---|---|---|
| Mother Liquor - No treatment | 22.6 | 7.0 | 31.0 |
| Crystals - No treatment | 58.0 | 8.6 | 14.8 |

What is claimed is:

1. A process for producing ammonium phosphate that is substantially free of arsenic which comprises:
   (a) reacting crude phosphoric acid containing dissolved arsenic having a +5 valence state with ammonia and arsenic-reducing agent in sufficient proportions to form an ammonium phosphate solution and to reduce the arsenic from the +5 valence state to a lower valence state;
   (b) forming ammonium phosphate crystals from said solution, leaving a mother liquor that contains substantially all of said arsenic; and
   (c) recovering said ammonium phosphate crystals that are substantially free of arsenic impurities from said mother liquor.

2. The process of claim 1 wherein said arsenic-reducing agent is a sulfur-bearing compound selected from the group consisting of alkali metal sulfides, ammonium sulfide, hydrogen sulfide, alkali metal sulfites, ammonium sulfite, sulfur dioxide, alkali metal thiosulfates, and ammonium thiosulfate.

3. The process of claim 2 wherein said ammonium phosphate is selected from the group consisting of mono-ammonium phosphate, di-ammonium phosphate or combinations thereof.

4. The process of claim 3 wherein the amount of arsenic-reducing agent added to said crude phosphoric acid ranges from about the stoichiometric proportion to about 100 times the stoichiometric proportion necessary to react with all of said arsenic.

5. The process of claim 4 wherein said crude phosphoric acid contains other metallic impurities; and metallic phosphates are formed and precipitated from said metallic impurities, and said metallic phosphate precipitates are separated from said solution before said crystallizing step (b).

6. The process of claim 5 wherein said crude phosphoric acid is first reacted with sufficient ammonia to form a solution having a pH in the range of about 2.0 to about 4.0, then said arsenic-reducing agent is added to said solution and finally said solution reacted with sufficient ammonia to form an ammonium phosphate solution having a pH in the range of from about 5.0 to about 6.0.

7. The process of claim 6 wherein said arsenic-reducing agent is selected from the groups consisting of sodium sulfide, ammonium sulfide, potassium sulfide, hydrogen sulfide and sodium thiosulfate.

8. The process of claim 7 wherein the amount of arsenic ranges from more than 5 to about 200 parts per million parts by weight of P$_2$O$_5$ present in crude phosphoric acid, to less than about 5 parts per million parts by weight of P$_2$O$_5$ present in said ammonium phosphate crystals.

9. The process of claim 8 wherein said arsenic-reducing agent is ammonium sulfide.

10. The process of claim 8 wherein said arsenic-reducing agent is hydrogen sulfide.

11. The process of claim 8 wherein said arsenic-reducing agent is sodium thiosulfate.

12. The process of claim 5 wherein said crude phosphoric acid is first reacted with said arsenic-reducing agent, followed by reaction with said ammonia to form said ammonium phosphate solution.

13. A process for producing ammonium phosphate that is substantially free of arsenic which comprises:
   (a) reacting crude phosphoric acid containing dissolved arsenic having a +5 valence state and other metallic impurities with ammonia and alkali metal sulfide in sufficient proportions to form an ammonium phosphate solution to form and precipitate metallic phosphates from said other metallic impurities and to reduce the arsenic from the +5 valance state to a lower valence state;
   (b) separating said metallic phosphate precipitates from said solution;
   (c) then forming ammonium phosphate crystals from said solution, leaving a mother liquor that contains substantially all of said arsenic; and
   (d) recovering said ammonium phosphate crystals that are substantially free of said arsenic from said mother liquor.

14. The process of claim 13 wherein said ammonium phosphates are selected from the group consisting of mono-ammonium phosphate, di-ammonium phosphate or combinations thereof.

15. The process of claim 13 wherein said alkali metal sulfide is selected from the group consisting of potassium sulfide and sodium sulfide.

16. The process of claim 13 wherein the amount of arsenic is lowered from more than 5 to about 200 parts per million parts by weight of P$_2$O$_5$ present in said crude phosphoric acid to less than about 5 parts per million parts by weight of P$_2$O$_5$ present in said ammonium phosphate crystals.

17. The process of claim 16 wherein said crude phosphoric acid contains from about 15% to about 50% by weight of P$_2$O$_5$.

18. The process of claim 17 wherein the amount of alkali metal sulfide added to said crude phosphoric acid ranges from about the stoichiometric proportion to about 100 times the stoichiometric proportion necessary to react with all of said arsenic.

19. The process of claim 18 wherein said crude phosphoric acid is first reacted with sufficient ammonia to form a solution having a pH in the range of about 2.0 to about 4.0, then said alkali metal sulfide is added to said solution and finally said solution is reacted with sufficient ammonia to form an ammonium phosphate solution having a pH in the range of from about 5.0 to about 6.0.

20. The process of claim 19 wherein said alkali metal sulfide is sodium sulfide.

21. The process of claim 20 wherein said ammonium phosphate formed is mono-ammonium phosphate.

22. The process of claim 20 wherein said ammonium phosphate formed is di-ammonium phosphate.

23. The process of claim 21 wherein said amount of alkali metal sulfide added to said crude phosphoric acid ranges from about 10 times the stoichiometric proportion to about 75 times the stoichiometric proportion necessary to react with all of said arsenic impurities.

24. The process of claim 19 wherein said alkali metal sulfide is potassium sulfide.

25. The process of claim 18 wherein said crude phosphoric acid is first reacted with said alkali metal sulfide followed by reaction with said ammonia to form said ammonium phosphate solution.

* * * * *